(12) United States Patent
Sharma et al.

(10) Patent No.: US 12,360,447 B2
(45) Date of Patent: Jul. 15, 2025

(54) RECONFIGURABLE DISPLAY SYSTEM

(71) Applicant: GM Global Technology Operations LLC, Detroit, MI (US)

(72) Inventors: Manoj Sharma, Troy, MI (US); Thomas A. Seder, Fraser, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 18/323,597

(22) Filed: May 25, 2023

(65) Prior Publication Data

US 2024/0393670 A1 Nov. 28, 2024

(51) Int. Cl.
| | |
|---|---|
| *G03B 21/62* | (2014.01) |
| *B60K 35/00* | (2024.01) |
| *B60K 35/81* | (2024.01) |
| *G03B 21/00* | (2006.01) |
| *G03B 21/20* | (2006.01) |

(52) U.S. Cl.
CPC .............. *G03B 21/62* (2013.01); *B60K 35/00* (2013.01); *G03B 21/006* (2013.01); *G03B 21/204* (2013.01); *B60K 35/81* (2024.01); *B60K 2360/66* (2024.01)

(58) Field of Classification Search
CPC .... G03B 21/62; G03B 21/006; G03B 21/204; B60K 35/00; B60K 35/81; B60K 2360/66
USPC ....................................................... 359/443
See application file for complete search history.

(56) References Cited

U.S. PATENT DOCUMENTS

| | | | | |
|---|---|---|---|---|
| 8,317,329 | B2* | 11/2012 | Seder | G02B 27/01 |
| | | | | 359/452 |
| 11,267,340 | B2* | 3/2022 | Nakajima | B60K 35/285 |
| 11,663,939 | B1* | 5/2023 | Weiss | B60K 35/60 |
| | | | | 345/7 |
| 11,670,260 | B2* | 6/2023 | Tucker | B60Q 9/00 |
| | | | | 345/8 |
| 11,971,544 | B2* | 4/2024 | Seder | G06T 1/20 |
| 11,977,243 | B1* | 5/2024 | Szczerba | G06F 3/167 |
| 12,024,016 | B1* | 7/2024 | Sharma | B60K 35/00 |
| 12,039,900 | B1* | 7/2024 | Sharma | G02B 27/0101 |
| 2010/0253918 | A1* | 10/2010 | Seder | G08G 1/167 |
| | | | | 353/13 |

(Continued)

FOREIGN PATENT DOCUMENTS

| | | | | |
|---|---|---|---|---|
| CN | 111929893 | A * | 11/2020 | ......... G02B 27/0101 |
| CN | 119031105 | A * | 11/2024 | ............. B60K 35/00 |

(Continued)

OTHER PUBLICATIONS

United States Patent and Trademark Office. U.S. Appl. No. 17/749,464, filed May 20, 2022.

*Primary Examiner* — Stephanie E Bloss
*Assistant Examiner* — Kevin C Butler
(74) *Attorney, Agent, or Firm* — Vivacqua Crane, PLLC

(57) ABSTRACT

A display system for a vehicle includes a projection screen having an adjustable opacity, a projector for projecting an image on the projection screen, and a controller in electrical communication with the projector. The controller is programmed to adjust the opacity of the projection screen and direct the projector to project the image on the projection screen.

20 Claims, 6 Drawing Sheets

(56) References Cited

U.S. PATENT DOCUMENTS

| | | | |
|---|---|---|---|
| 2010/0274473 A1* | 10/2010 | Konishi | G01C 21/3697 |
| | | | 701/532 |
| 2015/0321606 A1* | 11/2015 | Vartanian | G02B 27/0179 |
| | | | 348/148 |
| 2016/0111002 A1* | 4/2016 | Moise | G08G 1/144 |
| | | | 340/932.2 |
| 2017/0053450 A1* | 2/2017 | Rodriguez | H04N 13/344 |
| 2017/0212633 A1* | 7/2017 | You | B60K 35/00 |
| 2020/0242935 A1* | 7/2020 | Nagata | G06Q 20/127 |
| 2020/0254877 A1* | 8/2020 | Nakajima | B60K 35/285 |
| 2021/0191132 A1* | 6/2021 | Karner | B60K 35/28 |
| 2021/0241723 A1* | 8/2021 | Tucker | G02B 27/017 |
| 2021/0360211 A1* | 11/2021 | Kawamura | B60K 35/425 |
| 2022/0317443 A1* | 10/2022 | Matsui | B60K 35/00 |
| 2023/0135641 A1* | 5/2023 | Miyake | B60K 35/22 |
| | | | 701/36 |
| 2023/0375829 A1* | 11/2023 | Seder | B60K 35/00 |
| 2024/0393670 A1* | 11/2024 | Sharma | G03B 21/204 |
| 2025/0037474 A1* | 1/2025 | Gautam | G02B 27/0179 |

FOREIGN PATENT DOCUMENTS

| | | | | |
|---|---|---|---|---|
| DE | 102017130623 A1 * | 6/2018 | | G06K 9/00805 |
| DE | 102017004859 A1 | 3/2019 | | |
| GB | 2576738 A * | 3/2020 | | B60K 35/00 |
| WO | WO-2013088510 A1 * | 6/2013 | | B60K 35/00 |
| WO | WO-2019073983 A1 * | 4/2019 | | B32B 17/10036 |

\* cited by examiner

RECONFIGURABLE DISPLAY SYSTEM

INTRODUCTION

The present disclosure relates to entertainment systems for a vehicle, and more particularly, to a display system for a vehicle.

To increase occupant comfort and convenience, vehicles may be equipped with entertainment systems which are configured to provide entertainment for occupants inside and/or outside of the vehicle. Entertainment systems may include audio systems such as speaker systems. Speaker systems may be configured to play music and/or other media inside and/or outside of the vehicle for entertainment purposes. Entertainment systems may also include visual systems, such as, for example, display systems. Display systems may be used to play visual media, such as, for example, videos, for entertainment purposes. However, current entertainment systems may have constrained viewing angles, requiring occupants to view from a specific location. Additionally, current entertainment systems may have small viewing areas (e.g., a small screen) to conserve resources and space within the vehicle.

Thus, while current entertainment systems and methods achieve their intended purpose, there is a need for a new and improved system and method for displaying an image for a vehicle.

SUMMARY

According to several aspects, a display system for a vehicle is provided. The display system includes a projection screen having an adjustable opacity, a projector for projecting an image on the projection screen, and a controller in electrical communication with the projector. The controller is programmed to adjust the opacity of the projection screen and direct the projector to project the image on the projection screen.

In another aspect of the present disclosure, the projection screen further may include a projection surface including a first film layer including a plurality of transparent phosphors. The projection surface further includes a second film layer affixed to the first film layer. An opacity of the second film layer is adjusted based at least in part on an electrical signal from the controller.

In another aspect of the present disclosure, the projections screen further including a projection surface storage compartment. The projection surface stowage compartment is configured to store the projection surface in a rolled form.

In another aspect of the present disclosure, the projection surface stowage compartment is removably affixed to a headliner of the vehicle. The projection surface stowage compartment is configured to be movable along a horizontal axis of the projection surface stowage compartment and rotatable along a vertical axis of the projection surface stowage compartment.

In another aspect of the present disclosure, the projector is an ultraviolet projector configured to selectively excite the plurality of transparent phosphors of the first film layer.

In another aspect of the present disclosure, the second film layer further may include a liquid-crystal layer having a first side and second side. The liquid-crystal layer includes a plurality of liquid-crystals. The plurality of liquid-crystals has at least one of a parallel orientation and a scattering orientation. The second film layer further may include a first electrode affixed to the first side of the liquid-crystal layer and a second electrode affixed to the second side of the liquid-crystal layer.

In another aspect of the present disclosure, to adjust the opacity of the projection screen, the controller is further programmed to determine an intended viewing location of the projection screen. To adjust the opacity of the projection screen, the controller is further programmed to set the opacity of the projection screen to an opaque mode in response to determining that the intended viewing location is a projector side of the projection screen. To adjust the opacity of the projection screen, the controller is further programmed to set the opacity of the projection screen to a transparent mode in response to determining that the intended viewing location is a non-projector side of the projection screen.

In another aspect of the present disclosure, to set the opacity of the projection screen to the opaque mode, the controller is further programmed to apply a zero voltage potential across the first electrode and the second electrode of the second film layer to orient the plurality of liquid-crystals in the scattering orientation.

In another aspect of the present disclosure, to set the opacity of the projection screen to the transparent mode, the controller is further programmed to apply a non-zero voltage potential across the first electrode and the second electrode of the second film layer to orient the plurality of liquid-crystals in the parallel orientation.

In another aspect of the present disclosure, to project the image on the projection screen, the controller is further programmed to determine the image to project. To project the image on the projection screen, the controller is further programmed to project the image on the projection surface using the projector in response to determining that the intended viewing location is the projector side of the projection screen. To project the image on the projection screen, the controller is further programmed to generate a reversed image in response to determining that the intended viewing location is the non-projector side of the projection screen. To project the image on the projection screen, the controller is further programmed to project the reversed image on the projection surface using the projector in response to determining that the intended viewing location is the non-projector side of the projection screen.

According to several aspects, a method for displaying an image for a vehicle is provided. The method includes adjusting an opacity of a projection screen and projecting the image on the projection screen using a projector.

In another aspect of the present disclosure, adjusting the opacity of the projection screen further may include determining an intended viewing location of the projection screen. The intended viewing location includes one of a projector side of the projection screen and a non-projector side of the projection screen. Adjusting the opacity of the projection screen further may include adjusting the opacity of the projection screen based at least in part on the intended viewing location of the projection screen.

In another aspect of the present disclosure, adjusting the opacity of the projection screen based at least in part on the intended viewing location of the projection screen further may include setting the opacity of the projection screen to an opaque mode in response to determining that the intended viewing location is a projector side of the projection screen. Adjusting the opacity of the projection screen based at least in part on the intended viewing location of the projection screen further may include setting the opacity of the projection screen to a transparent mode in response to determining that the intended viewing location is a non-projector side of the projection screen.

In another aspect of the present disclosure, setting the opacity of the projection screen to the opaque mode further may include applying a zero voltage potential across a first electrode and a second electrode of a second film layer of the projection screen to orient a plurality of liquid-crystals in a liquid-crystal layer of the second film layer of the projection screen in a scattering orientation.

In another aspect of the present disclosure, setting the opacity of the projection screen to the transparent mode further may include applying a non-zero voltage potential across a first electrode and a second electrode of a second film layer of the projection screen to orient a plurality of liquid-crystals in a liquid-crystal layer of the second film layer of the projection screen in a parallel orientation.

In another aspect of the present disclosure, projecting the image on the projection screen further may include determining the image to project. Projecting the image on the projection screen further may include projecting the image on the projection screen using the projector in response to determining that the intended viewing location is the projector side of the projection screen. Projecting the image on the projection screen further may include generating a reversed image in response to determining that the intended viewing location is the non-projector side of the projection screen. Projecting the image on the projection screen further may include projecting the reversed image on the projection screen using the projector in response to determining that the intended viewing location is the non-projector side of the projection screen.

In another aspect of the present disclosure, projecting the image on the projection screen further may include producing an excitation light including at least one wavelength of ultraviolet light using the projector. Projecting the image on the projection screen further may include exciting at least one of a plurality of transparent phosphors of a first film layer of the projection screen using the excitation light. The at least one of the plurality of transparent phosphors excited by the excitation light produces an emission light forming the image.

According to several aspects, a display system for a vehicle is provided. The display system includes a projection screen having an adjustable opacity. The display system also includes a projector for projecting an image on the projection screen. The display system also includes a controller in electrical communication with the projector. The controller is programmed to determine an intended viewing location of the projection screen. The controller is further programmed to set an opacity of the projection screen to an opaque mode in response to determining that the intended viewing location is a projector side of the projection screen. The controller is further programmed to set the opacity of the projection screen to a transparent mode in response to determining that the intended viewing location is a non-projector side of the projection screen. The controller is further programmed to direct the projector to project the image on the projection screen.

In another aspect of the present disclosure, the projection screen further may include a projection surface including a first film layer including a plurality of transparent phosphors. The projection surface further may include a second film layer affixed to the first film layer. An opacity of the second film layer is adjusted based at least in part on an electrical signal from the controller. The second film layer further may include a liquid-crystal layer having a first side and second side. The liquid-crystal layer includes a plurality of liquid-crystals. The plurality of liquid-crystals may have a parallel orientation or a scattering orientation. The second film layer further may include a first electrode affixed to the first side of the liquid-crystal layer. The second film layer further may include a second electrode affixed to the second side of the liquid-crystal layer. The projection screen further may include a projection surface stowage compartment.

In another aspect of the present disclosure, to project the image on the projection screen, the controller is further programmed to retrieve the image using the vehicle communication system and project the image on the projection screen using the projector.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Use of display systems incorporating transparent phosphors as part of head-up display (HUD) systems in vehicles has been proposed in U.S. application Ser. No. 17/749,464 titled "HYBRID AUGMENTED REALITY HEAD-UP DISPLAY FOR CREATING AN EDGE-TO-EDGE AUGMENTED REALITY VIEW", which was filed on May 20, 2022 and has since matured into U.S. Pat. No. 11,971,544, the entire contents of which is hereby incorporated by reference. The present disclosure provides a new and improved system and method for displaying images for a vehicle, including a reconfigurable projection screen which allows for multi-angle viewing.

Figure 1:
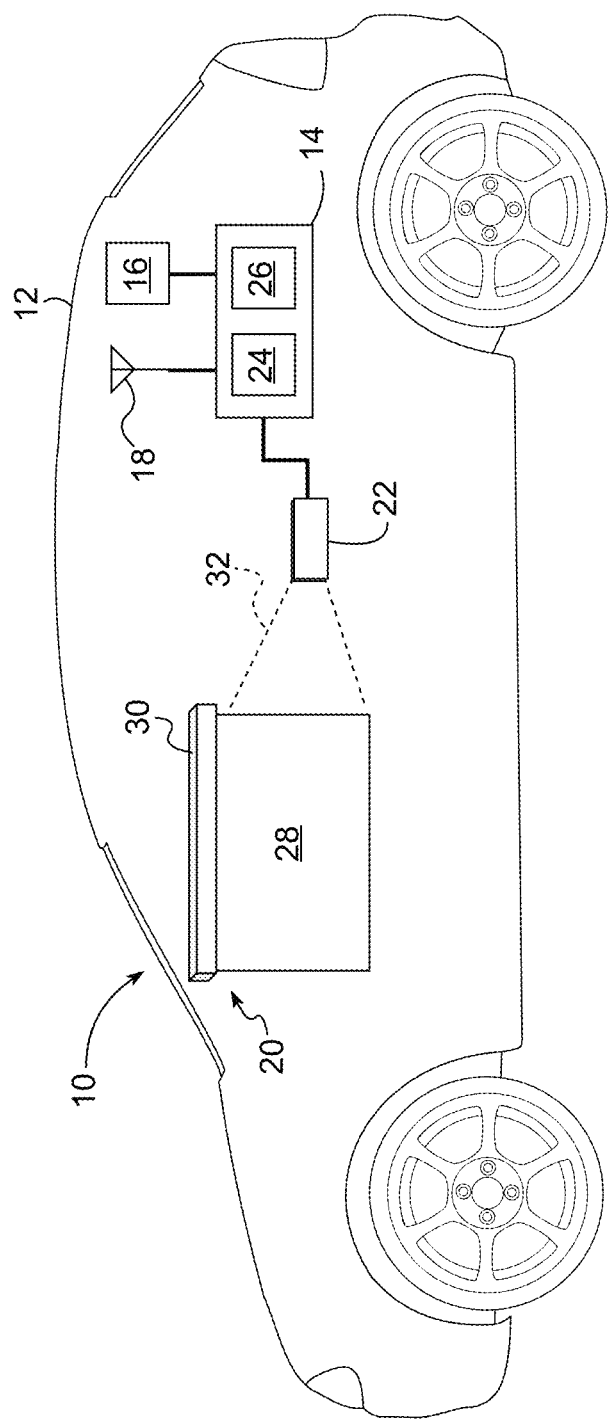
FIG. 1 is a schematic diagram of a display system for a vehicle, according to an exemplary embodiment.

Referring to FIG. 1, a display system for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a plurality of vehicle sensors 16, a vehicle communication system 18, a projection screen 20, and a projector 22.

The controller 14 is used to implement a method 100 for displaying an image for a vehicle, as will be described below. The controller 14 includes at least one processor 24 and a non-transitory computer readable storage device or media 26. The processor 24 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 26 may include volatile and nonvolatile storage in read-only memory (ROM), random-access memory (RAM), and keep-alive memory (KAM), for example. KAM is a persistent or non-volatile memory that may be used to store various operating variables while the processor 24 is powered down. The computer-readable storage device or media 26 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16, the vehicle communication system 18, and the projector 22. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The plurality of vehicle sensors 16 is used to determine performance data about the vehicle 12 and/or information about an environment in and/or surrounding the vehicle 12. In an exemplary embodiment, the plurality of vehicle sensors 16 includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of vehicle sensors 16 further includes sensors to determine information about the environment within the vehicle 12, such as, for example, a seat occupancy sensor, a cabin air temperature sensor, a cabin motion detection sensor, a cabin camera, a cabin microphone, and/or the like. In another exemplary embodiment, the plurality of vehicle sensors 16 further includes sensors to determine information about the environment surrounding the vehicle 12, for example, an ambient air temperature sensor, a barometric pressure sensor, and/or a photo and/or video camera which is positioned to view the environment in front of the vehicle 12. In another exemplary embodiment, at least one of the plurality of vehicle sensors 16 is capable of measuring distances in the environment surrounding the vehicle 12. In a non-limiting example wherein the plurality of vehicle sensors 16 includes a camera, the plurality of vehicle sensors 16 measures distances using an image processing algorithm configured to process images from the camera and determine distances between objects. In another non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen of the vehicle 12. In another example, at least one of the plurality of vehicle sensors 16 is affixed outside of the vehicle 12, for example, on a roof of the vehicle 12, having a view of the environment surrounding the vehicle 12. It should be understood that various additional types of vehicle sensors, such as, for example, LiDAR sensors, ultrasonic ranging sensors, radar sensors, and/or time-of-flight sensors are within the scope of the present disclosure.

The vehicle communication system 18 is used by the controller 14 to communicate with other systems external to the vehicle 12. For example, the vehicle communication system 18 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 18 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 18 may further include an embedded universal integrated circuit card (eUICC) configured to store at least one cellular connectivity configuration profile, for example, an embedded subscriber identity module (eSIM) profile. The vehicle communication system 18 is further configured to communicate via a personal area network (e.g., BLUETOOTH) and/or near-field communication (NFC). However, additional, or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 18 may include one or more antennas and/or communication transceivers for receiving and/or transmitting signals, such as cooperative sensing messages (CSMs). The vehicle communication system 18 is configured to wirelessly communicate information between the vehicle 12 and another vehicle. Further, the vehicle communication system 18 is configured to wirelessly communicate information between the vehicle 12 and infrastructure or other vehicles. It should be understood that the vehicle communication system 18 may be integrated with the controller 14 (e.g., on a same circuit board with the controller 14 or otherwise a part of the controller 14) without departing from the scope of the present disclosure.

The projection screen 20 is used to display images projected by the projector 22. In an exemplary embodiment, the projection screen 20 includes a projection surface 28 and a projection surface stowage compartment 30.

Figure 2A:
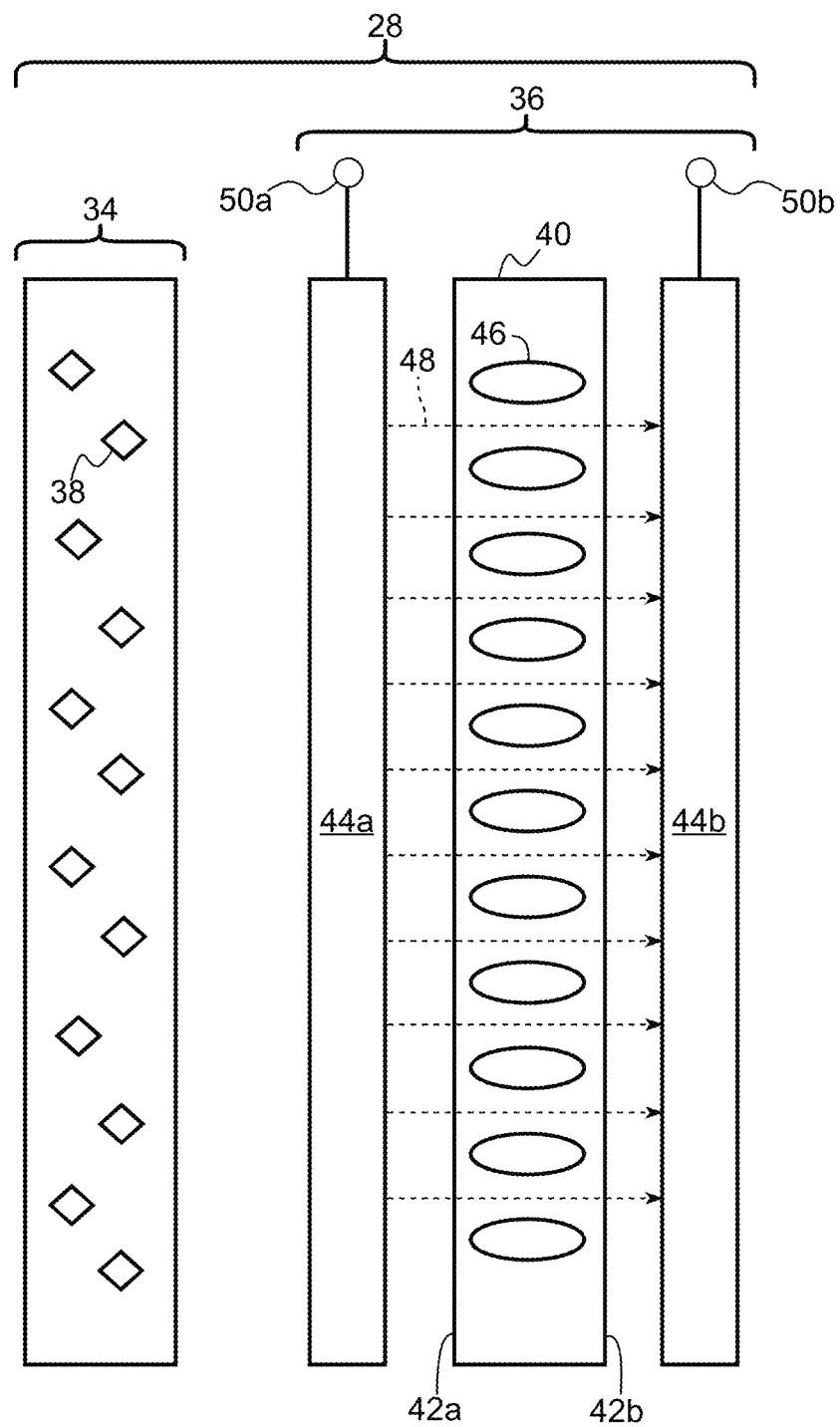
FIG. 2A is a first exploded schematic diagram of a projection surface with an electric field, according to an exemplary embodiment.

The projection surface 28 is used to produce an emission light to form an image in response to an excitation light 32 provided by the projector 22. Referring to FIG. 2A, a first exploded schematic diagram of the projection surface 28 with an electric field is shown. In an exemplary embodiment, the projection surface 28 includes a first film layer 34 and a second film layer 36 affixed to the first film layer 34 (e.g., using an optical adhesive).

The first film layer 34 is a flexible film substrate (e.g., a transparent thermoplastic) which includes a plurality of transparent phosphors 38. The plurality of transparent phosphors 38 are light emitting particles which fluoresce in response to being excited by the excitation light 32. In an exemplary embodiment, the plurality of transparent phosphors 38 are red, green, and blue (RGB) phosphors, allowing full color image display. The use of monochrome and/or two-color phosphors is also within the scope of the present disclosure. When the excitation light 32 is absorbed by the transparent phosphors, visible light (i.e., the emission light) is emitted by the transparent phosphors. The excitation light 32 may be, for example, violet light in the visible spectrum (ranging from about 380 to 450 nanometers) and/or ultraviolet light.

The second film layer 36 is a flexible film with a variable opacity. The opacity of the second film layer 36 is adjusted based at least in part on an electrical signal from the controller 14. In an exemplary embodiment, the second film layer 36 is a polymer-dispersed liquid-crystal (PDLC) film. In a non-limiting example, the second film layer 36 includes a liquid-crystal layer 40 having a first side 42a and a second side 42b. The second film layer 36 further includes a first electrode 44a affixed to the first side 42a of the liquid-crystal layer 40 and a second electrode 44b affixed to the second side 42b of the liquid-crystal layer 40.

The liquid-crystal layer 40 is a flexible film layer used to manipulate light incident upon the second film layer 36. The liquid crystal layer 40 includes a plurality of liquid-crystals 46. In a non-limiting example, each of the plurality of liquid-crystals 46 is a rod-shaped molecule having properties between those of liquids and those of solid crystals. An orientation the plurality of liquid-crystals 46 may be manipulated to change optical properties of the liquid-crystal layer 40. In a non-limiting example, the orientation of the plurality of liquid-crystals 46 may be manipulated by an electric field, as will be discussed in greater detail below.

Figure 2B:
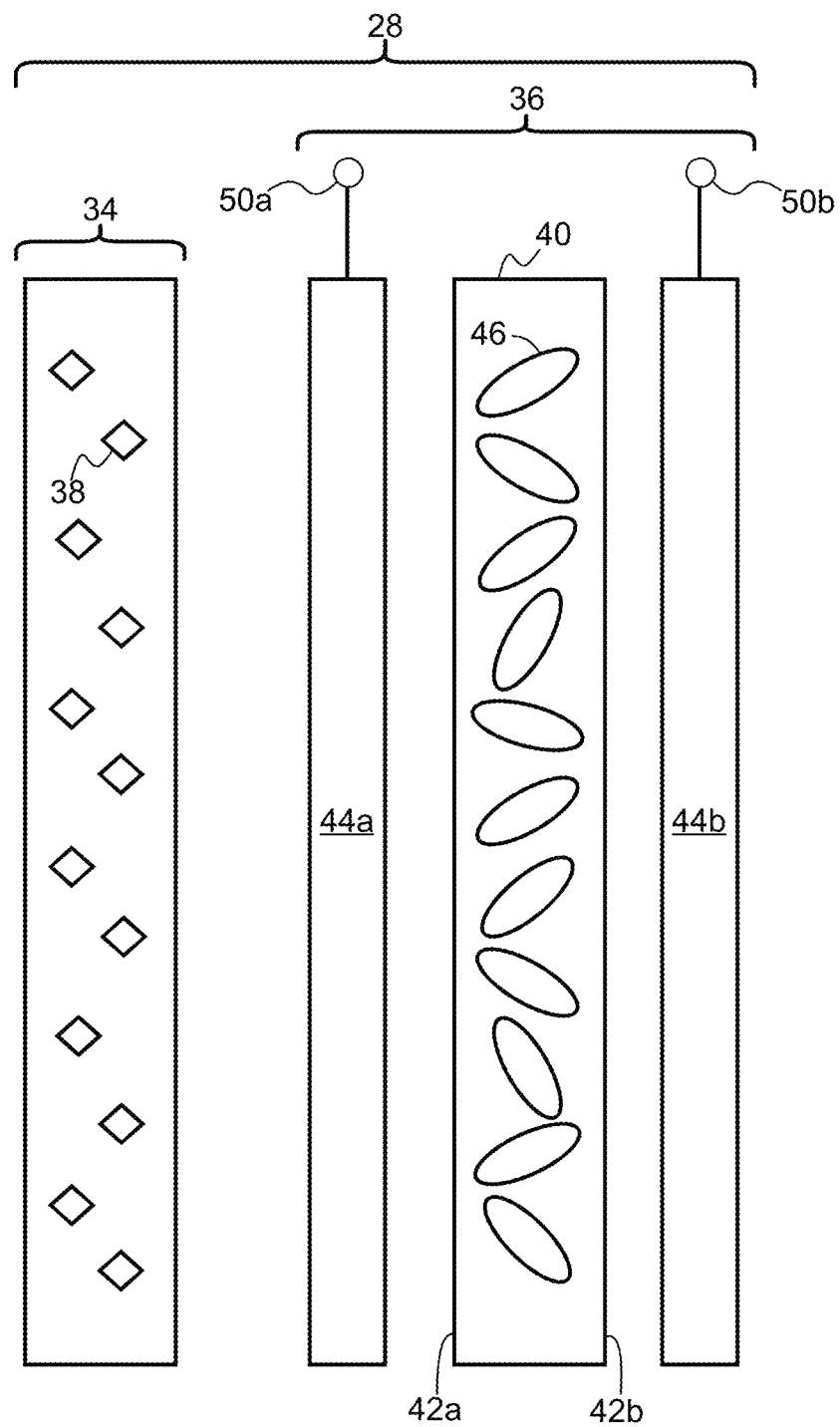
FIG. 2B is a second exploded schematic diagram of the projection surface without the electric field, according to an exemplary embodiment.

The first electrode 44a and the second electrode 44b are used to produce the electric field (indicated by the electric field lines 48 in FIG. 2A) used to align the plurality of liquid-crystals 46. In the presence of the electric field, as shown in FIG. 2A, the plurality of liquid-crystals 46 assume a parallel orientation. In the scope of the present disclosure, the parallel orientation allows the light incident upon the liquid-crystal layer 40 to be transmitted through the liquid-crystal layer 40 with minimal scattering (i.e., a transparent mode of the liquid-crystal layer 40). Referring to FIG. 2B, a second exploded schematic diagram of the projection surface 28 without the electric field is shown. In the absence of the electric field, as shown in FIG. 2B, the plurality of liquid-crystals 46 assume a scattering orientation. In the scope of the present disclosure, the scattering orientation scatters the light incident upon the liquid-crystal layer 40, such that minimal light is transmitted through the liquid-crystal layer 40 (i.e., an opaque mode of the liquid-crystal layer 40). In an exemplary embodiment, the plurality of liquid-crystals 46 are dyed with a black dye, such that the liquid-crystal layer 40 appears black in the opaque mode.

The first electrode 44a and the second electrode 44b are made from a transparent, flexible, and conductive material. The first electrode 44a and the second electrode 44b may be formed as coatings on the first side 42a and the second side 42b of the liquid-crystal layer 40 (e.g., a layer of indium tin oxide) or formed as separate layers (e.g., a conductive polymer) adhered to the liquid-crystal layer 40 using, for example, an optical adhesive. The first electrode 44a includes a first terminal 50a in electrical communication with the first electrode 44a and the second electrode 44b includes a second terminal 50b in electrical communication with the second electrode 44b. The first terminal 50a and the second terminal 50b are in electrical communication with the controller 14, such that the controller 14 may induce the electric field between the first terminal 50a and the second terminal 50b to switch the liquid-crystal layer 40 between the transparent mode and the opaque mode, as discussed above.

For the sake of clarity, the second film layer 36 is described above as a polymer-dispersed liquid-crystal (PDLC) film. However, it should be understood that the second film layer 36 may be any flexible film with a variable opacity, including, for example, an electrochromic device, a suspended particle device, a micro-blind device, and/or other types of variable opacity substrates (sometimes referred to as "smart film" or "smart glass") without departing from the scope of the present disclosure.

Figure 3A:
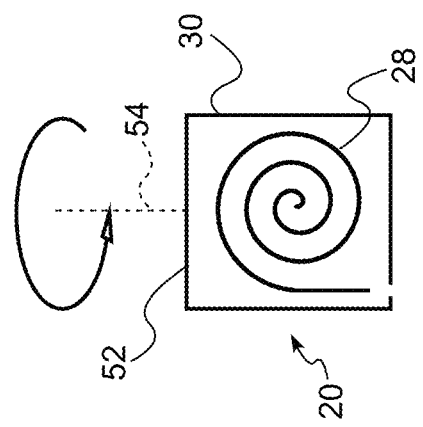
FIG. 3A is a schematic diagram of a projection surface stowage compartment in a stowed state, according to an exemplary embodiment.
Figure 3B:
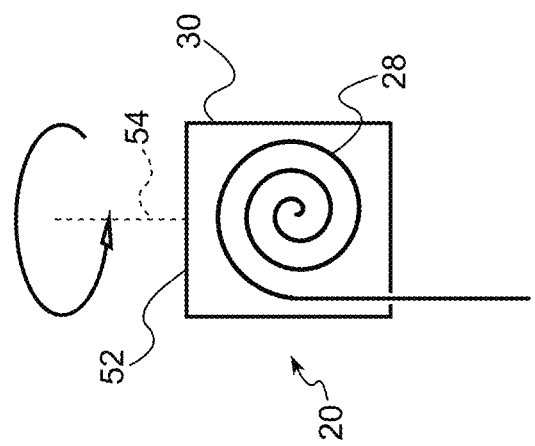
FIG. 3B is a schematic diagram of the projection surface stowage compartment in a deployed state, according to an exemplary embodiment.

The projection surface stowage compartment 30 is used to store the projection surface 28 when it is not in use. Referring to FIG. 3A, a schematic diagram of the projection surface stowage compartment 30 in a deployed state is shown. Referring to FIG. 3B, a schematic diagram of the projection surface stowage compartment 30 in a stowed state is shown. The projection surface stowage compartment 30 is a container having at least a same width as the projection surface 28. In a non-limiting example, the projection surface stowage compartment 30 is made from a plastic material. In a non-limiting example, the projection surface stowage compartment 30 is made from a metal or alloy material (e.g., aluminum).

Figure 4:
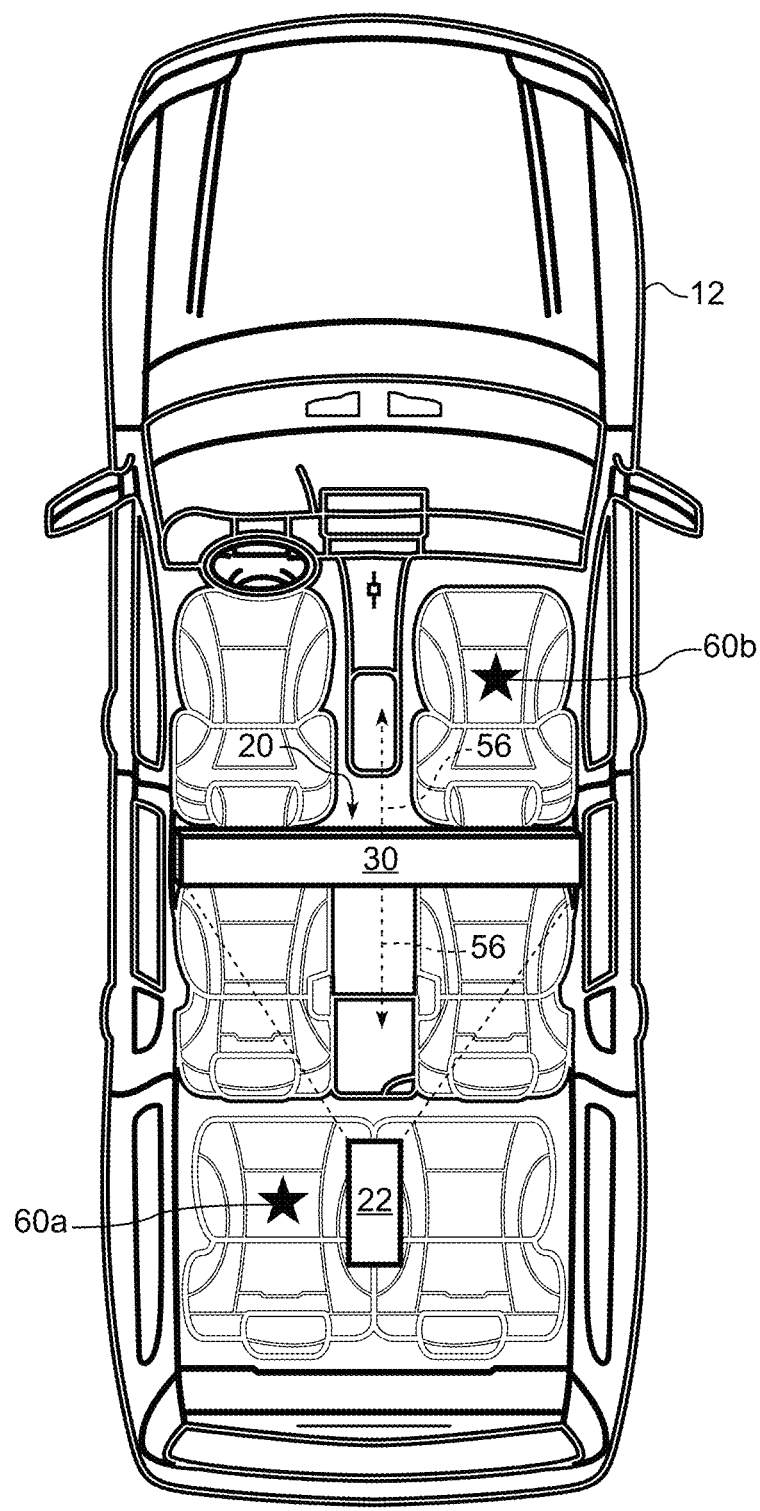
FIG. 4 is a schematic diagram of the projection surface stowage compartment and a projector within the vehicle, according to an exemplary embodiment.

As shown in FIGS. 3A and 3B, the projection surface 28 is stored within the projection surface stowage compartment 30 by rolling the projection surface 28. In an exemplary embodiment, the projection surface stowage compartment 30 includes a locking spring mechanism which allows the projection surface 28 to be manually deployed from the projection surface stowage compartment 30 and locked at a predetermined deployment length. In another exemplary embodiment, the projection surface stowage compartment 30 includes an electromechanical mechanism in electrical communication with the controller 14, allowing the projection surface 28 to be deployed based on signals from the controller 14. A top side 52 of the projection surface stowage compartment 30 is movably affixed to a headliner of the vehicle 12. In a non-limiting example, the projection surface stowage compartment 30 is affixed to the headliner of the vehicle 12 using a gantry structure. In another non-limiting example, the projection surface stowage compartment 30 is affixed to the headliner of the vehicle 12 using a magnetic mounting system. In an exemplary embodiment, the projection surface stowage compartment 30 is rotatable relative to the headliner around at least a vertical axis 54 as indicated in FIGS. 3A and 3B. Referring to FIG. 4, a schematic diagram of the projection surface stowage compartment 30 and the projector 22 within the vehicle 12 is shown. As shown in FIG. 4, the projection surface stowage compartment 30 is additionally movable relative to the headliner along at least horizontal axis 56 towards a front or rear of the vehicle 12. In another exemplary embodiment, the projection surface stowage compartment 30 is removably affixed to the headliner of the vehicle 12, such that the projection surface stowage compartment 30 may be removed from the vehicle 12 for use outside the vehicle 12.

The projector 22 is used to produce the excitation light 32 to excite the plurality of transparent phosphors 38 in the first film layer 34 of the projection surface 28. In an exemplary embodiment, the projector 22 is disposed proximally to the headliner of the vehicle 12. In a non-limiting example, the projector 22 is affixed to the headliner of the vehicle 12 using a gantry structure. In another non-limiting example, the projector 22 is affixed to the headliner of the vehicle 12 using a magnetic mounting system. The projector 22 is movable along at least a horizontal axis and rotatable around at least a vertical axis, in an analogous manner to the projection surface stowage compartment 30 as described above. In another exemplary embodiment, the projector 22 is removably affixed to the headliner of the vehicle 12, such that the projector 22 may be removed from the vehicle 12 for use outside the vehicle 12.

In an exemplary embodiment, the projector 22 is an ultraviolet projector configured to produce a plurality of wavelengths of excitation light 32 to excite the plurality of transparent phosphors 38. In a non-limiting example, the projector 22 uses laser light sources to produce the plurality of wavelengths of light. In another non-limiting example, the projector 22 uses LED light sources to produce the plurality of wavelengths of light. In a non-limiting example, the projector 22 uses an optoelectrical mirror, such as, for example, a microelectromechanical scanning mirror, a galvanometer mirror, a digital micromirror device (DMD), and/or the like to direct the excitation light 32 in order to display images or graphics. In embodiments wherein the optoelectrical mirror includes the DMD, the projector 22 may be referred to as a digital light processing (DLP) projector. In a non-limiting example, the projector 22 is configured to produce a 380 nanometer light to excite red transparent phosphors of the plurality of transparent phosphors 38. The projector 22 is further configured to produce a 405 nanometer light to excite blue transparent phosphors of the plurality of transparent phosphors 38. The projector 22 is further configured to produce a 460 nanometer light to excite green transparent phosphors of the plurality of transparent phosphors 38. It should be understood that in some embodiments, the plurality of transparent phosphors 38 may be excited by other wavelengths of excitation light. The projector 22 may be configured to produce any wavelengths of excitation light 32 required to excite the plurality of transparent phosphors 38.

Figure 5:
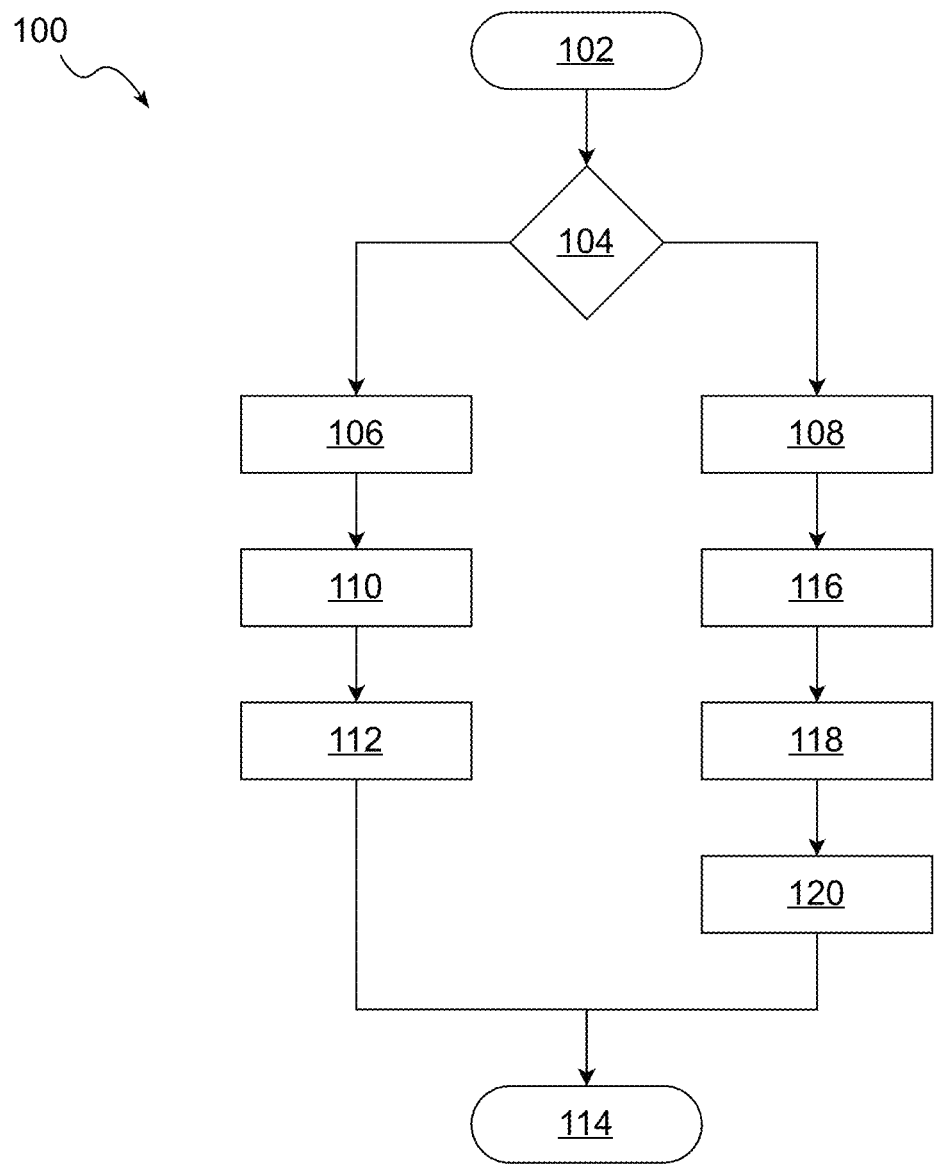
FIG. 5 is a flowchart of a method for displaying an image for a vehicle, according to an exemplary embodiment.

Referring to FIG. 5, a flowchart of the method 100 for displaying an image for a vehicle is provided. The method 100 begins at block 102 and proceeds to block 104. At block 104, the controller 14 determines an intended viewing location of the projection screen 20. In the scope of the present disclosure, the intended viewing location of the projection screen 20 is a location relative to the projection screen 20 and the projector 22 from which an occupant or user intends to view the projection screen 20. Referring again to FIG. 4, in an exemplary embodiment, the intended viewing location may include either a projector side 60a of the projection screen 20 or a non-projector side 60b of the projection screen 20. As illustrated in FIG. 4, if the intended viewing location is the projector side 60a, the occupant intends to view the projection screen 20 from a same side of the projection screen 20 as the projector 22. If the intended viewing location is the non-projector side 60b, the occupant intends to view the projection screen 20 from an opposite side of the projection screen 20 from the projector 22.

In an exemplary embodiment, to determine the intended viewing location, the controller 14 receives an input from the occupant via a human-interface device (e.g., a touchscreen infotainment system, an electromechanical button or switch, and/or the like). In another exemplary embodiment, to determine the intended viewing location, the controller 14 uses one or more of the plurality of vehicle sensors 16 to determine a location of one or more occupants relative to the location of the projection screen 20 and the projector 22. In a non-limiting example, the controller 14 receives voice commands from an occupant using the cabin microphone of the plurality of vehicle sensors 16. In another non-limiting example, the controller 14 determines the location of the one or more occupants of the vehicle 12 using at least one of the seat occupancy sensor of the plurality of vehicle sensors 16 and/or the cabin camera of the plurality of vehicle sensors 16. Referring again to FIG. 5, if the intended viewing location is determined to be the projector side 60a, the method 100 proceeds to block 106. If the intended viewing location is determined to be the non-projector side 60b, the method 100 proceeds to block 108.

At block 106, the controller 14 sets the opacity of the projection screen 20 to be the opaque mode. In an exemplary embodiment, to set the opacity of the projection screen to be the opaque mode, the controller 14 applies a zero voltage potential across the first terminal 50a and the second terminal 50b, such that no electric field is induced, and the plurality of liquid-crystals 46 assume the scattering orientation, as discussed above and shown in FIG. 2B. Therefore, the projection screen 20 appears opaque, such that the images produced by excitation of the plurality of transparent phosphors 38 are only visible from the projector side 60a. After block 106, the method 100 proceeds to block 110.

At block 110, the controller 14 determines an image to project. In the scope of the present disclosure, the image may include a still image, a plurality of still images, and/or video. In an exemplary embodiment, to determine the image to project, the controller 14 receives an input from the occupant via a human-interface device (e.g., a touchscreen infotainment system, an electromechanical button or switch, and/or the like). In another exemplary embodiment, to determine the image to project, the controller 14 uses one or more of the plurality of vehicle sensors 16. In a non-limiting example, the controller 14 receives voice commands from an occupant using the cabin microphone of the plurality of vehicle sensors 16. In an exemplary embodiment, the controller 14 uses the vehicle communication system 18 to retrieve media from a remote server. In a non-limiting example, the image includes a live television broadcast, which is retrieved using the vehicle communication system 18. In another non-limiting example, the image includes media which is retrieved from the internet using the vehicle communication system 18. In yet another non-limiting example, the image includes media which is steamed and/or transferred from a mobile device (e.g., a smartphone) to the controller 14 via the vehicle communication system 18. After block 110, the method 100 proceeds to block 112.

At block 112, the controller 14 uses the projector 22 to project the image determined at block 110 onto the projection surface 28 of the projection screen 20. Because the projection surface 28 is in the opaque mode, and the image is projected using the projector 22, the occupant may view the projected image from the projector side 60*a* of the projection screen 20. After block 112, the method 100 proceeds to enter a standby state at block 114.

At block 108, the controller 14 sets the opacity of the projection screen 20 to be the transparent mode. In an exemplary embodiment, to set the opacity of the projection screen to be the transparent mode, the controller 14 applies a non-zero voltage potential (e.g., twelve volts) across the first terminal 50*a* and the second terminal 50*b*, such that the electric field is induced, and the plurality of liquid-crystals 46 assume the parallel orientation, as discussed above and shown in FIG. 2A and indicated by the electric field lines 48. Therefore, the projection screen 20 appears transparent, such that the images produced by excitation of the plurality of transparent phosphors 38 are visible from both the projector side 60*a* and the non-projector side 60*b*. After block 108, the method 100 proceeds to block 116.

At block 116, the controller 14 determines an image to project. In the scope of the present disclosure, the image may include a still image, a plurality of still images, and/or video. In an exemplary embodiment, to determine the image to project, the controller 14 receives an input from the occupant via a human-interface device (e.g., a touchscreen infotainment system, an electromechanical button or switch, and/or the like). In another exemplary embodiment, to determine the image to project, the controller 14 uses one or more of the plurality of vehicle sensors 16. In a non-limiting example, the controller 14 receives voice commands from an occupant using the cabin microphone of the plurality of vehicle sensors 16. In an exemplary embodiment, the controller 14 uses the vehicle communication system 18 to retrieve media from a remote server. In a non-limiting example, the image includes a live television broadcast, which is retrieved using the vehicle communication system 18. In another non-limiting example, the image includes media which is retrieved from the internet using the vehicle communication system 18. In yet another non-limiting example, the image includes media which is steamed and/or transferred from a mobile device (e.g., a smartphone) to the controller 14 via the vehicle communication system 18. After block 116, the method 100 proceeds to block 118.

At block 118, the controller 14 generates a reversed image. In an exemplary embodiment, to generate the reversed image, the controller 14 mirrors the image determined at block 114. After block 118, the method 100 proceeds to block 120.

At block 120, the controller 14 uses the projector 22 to project the reversed image generated at block 116 onto the projection surface 28 of the projection screen 20. Because the projection surface 28 is in the transparent mode, and the reversed image is projected, the occupant may view the projected image from the non-projector side 60*b*. After block 120, the method 100 proceeds to enter the standby state at block 114.

In an exemplary embodiment, the controller 14 repeatedly exits the standby state 114 and restarts the method 100 at block 102. In a non-limiting example, the controller 14 exits the standby state 114 and restarts the method 100 on a timer, for example, every three hundred milliseconds. By repeatedly performing the method 100, the opacity of the projection screen 20 may be updated based on reconfiguration of the location of the projection screen 20 relative to the projector 22.

The system 10 and method 100 of the present disclosure offer several advantages. By providing a flexible film incorporating the plurality of transparent phosphors 38, the projection screen 20 may be used to provide entertainment to occupants inside or outside of the vehicle 12. By providing the second film layer 36 with a variable opacity, the projection screen 20 and the projector 22 may be used in various configurations, allowing viewing from multiple perspectives (e.g., the projector side 60*a* and the non-projector side 60*b*). The projection surface stowage compartment 30 allows the projection screen 20 to be stowed when not in use. The projection surface stowage compartment 30 and the projector 22 are movably and removably mounted to the headliner of the vehicle 12, allowing for reconfiguration of and/or removal of the projection screen 20 and/or projector 22.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A display system for a vehicle, the display system comprising:
   a projection screen having an adjustable opacity, wherein the projection screen further comprises:
      a projection surface including:
         a first film layer, wherein the first film layer includes a plurality of transparent phosphors; and
         a second film layer affixed to the first film layer, wherein an opacity of the second film layer is adjusted based at least in part on an electrical signal; and
      a projection surface stowage compartment, wherein the projection surface stowage compartment is configured to store the projection surface in a rolled form;
   a projector for projecting an image on the projection screen; and
   a controller in electrical communication with the projector, wherein the controller is programmed to:
      adjust the opacity of the projection screen by providing the electrical signal to the second film layer of the projection screen; and
      direct the projector to project the image on the projection screen.

2. The display system of claim 1, wherein the projection surface stowage compartment is removably affixed to a headliner of the vehicle, and wherein the projection surface stowage compartment is configured to be movable along a horizontal axis of the projection surface stowage compartment and rotatable along a vertical axis of the projection surface stowage compartment.

3. The display system of claim 2, wherein the projection surface stowage compartment is magnetically affixed to the headliner of the vehicle.

4. The display system of claim 1, wherein the projector is an ultraviolet projector configured to selectively excite the plurality of transparent phosphors of the first film layer.

5. The display system of claim 4, wherein the projector is removably affixed to a headliner of the vehicle, and wherein the projector is configured to be movable along a horizontal axis of the projector and rotatable along a vertical axis of the projector.

6. The display system of claim 4, wherein the projector includes one or more LED light sources configured to produce ultraviolet light to selectively excite the plurality of transparent phosphors of the first film layer.

7. The display system of claim 4, wherein the projector is a digital light processing (DLP) projector configured to produce ultraviolet light to selectively excite the plurality of transparent phosphors of the first film layer.

8. The display system of claim 1, wherein the second film layer further comprises:
a liquid-crystal layer having a first side and second side, wherein the liquid-crystal layer includes a plurality of liquid-crystals, and wherein the plurality of liquid-crystals has at least one of a parallel orientation and a scattering orientation;
a first electrode affixed to the first side of the liquid-crystal layer; and
a second electrode affixed to the second side of the liquid-crystal layer.

9. The display system of claim 8, wherein to adjust the opacity of the projection screen, the controller is further programmed to:
determine an intended viewing location of the projection screen;
set the opacity of the projection screen to an opaque mode in response to determining that the intended viewing location is a projector side of the projection screen; and
set the opacity of the projection screen to a transparent mode in response to determining that the intended viewing location is a non-projector side of the projection screen.

10. The display system of claim 9, wherein to set the opacity of the projection screen to the opaque mode, the controller is further programmed to:
apply a zero voltage potential across the first electrode and the second electrode of the second film layer to orient the plurality of liquid-crystals in the scattering orientation.

11. The display system of claim 9, wherein to set the opacity of the projection screen to the transparent mode, the controller is further programmed to:
apply a non-zero voltage potential across the first electrode and the second electrode of the second film layer to orient the plurality of liquid-crystals in the parallel orientation.

12. The display system of claim 9, wherein to project the image on the projection screen, the controller is further programmed to:
determine the image to project;
project the image on the projection surface using the projector in response to determining that the intended viewing location is the projector side of the projection screen;
generate a reversed image in response to determining that the intended viewing location is the non-projector side of the projection screen; and
project the reversed image on the projection surface using the projector in response to determining that the intended viewing location is the non-projector side of the projection screen.

13. A method for displaying an image for a vehicle, the method comprising:
determining an intended viewing location of a projection screen, wherein the intended viewing location includes one of a projector side of the projection screen and a non-projector side of the projection screen;
setting an opacity of the projection screen to an opaque mode in response to determining that the intended viewing location is a projector side of the projection screen, wherein setting the opacity of the projection screen to the opaque mode further comprises:
applying a zero voltage potential across a first electrode and a second electrode of a second film layer of the projection screen to orient a plurality of liquid-crystals in a liquid-crystal layer of the second film layer of the projection screen in a scattering orientation; and
setting the opacity of the projection screen to a transparent mode in response to determining that the intended viewing location is a non-projector side of the projection screen; and
projecting the image on the projection screen using a projector.

14. The method of claim 13, wherein setting the opacity of the projection screen to the transparent mode further comprises:
applying a non-zero voltage potential across a first electrode and a second electrode of a second film layer of the projection screen to orient a plurality of liquid-crystals in a liquid-crystal layer of the second film layer of the projection screen in a parallel orientation.

15. The method of claim 13, wherein projecting the image on the projection screen further comprises:
determining the image to project;
projecting the image on the projection screen using the projector in response to determining that the intended viewing location is the projector side of the projection screen;
generating a reversed image in response to determining that the intended viewing location is the non-projector side of the projection screen; and
projecting the reversed image on the projection screen using the projector in response to determining that the intended viewing location is the non-projector side of the projection screen.

16. The method of claim 15, wherein projecting the image on the projection screen further comprises:
producing an excitation light including at least one wavelength of ultraviolet light using the projector; and
exciting at least one of a plurality of transparent phosphors of a first film layer of the projection screen using the excitation light, wherein the at least one of the plurality of transparent phosphors excited by the excitation light produces an emission light forming the image.

17. The method of claim 13, wherein determining the intended viewing location further comprises:
determining a location of one or more vehicle occupants relative to a location of the projection screen using one or more of a plurality of vehicle sensors; and
determining the intended viewing location based at least in part on the location of the one or more vehicle occupants relative to the location of the projection screen.

18. A display system for a vehicle, the display system comprising:
a projection screen having an adjustable opacity, wherein the projection screen further comprises:
a projection surface including:
a first film layer, wherein the first film layer includes a plurality of transparent phosphors;
a second film layer affixed to the first film layer, wherein an opacity of the second film layer is adjusted based at least in part on an electrical signal, wherein the second film layer further comprises:
- a liquid-crystal layer having a first side and second side, wherein the liquid-crystal layer includes a plurality of liquid-crystals, and wherein the plurality of liquid-crystals may have a parallel orientation or a scattering orientation;
- a first electrode affixed to the first side of the liquid-crystal layer; and
- a second electrode affixed to the second side of the liquid-crystal layer; and a projection surface stowage compartment;
a projector for projecting an image on the projection screen; and
a controller in electrical communication with the projector, wherein the controller is programmed to:
- determine an intended viewing location of the projection screen;
- set an opacity of the projection screen to an opaque mode in response to determining that the intended viewing location is a projector side of the projection screen;
- set the opacity of the projection screen to a transparent mode in response to determining that the intended viewing location is a non-projector side of the projection screen; and
- direct the projector to project the image on the projection screen.

19. The display system of claim 18, further comprising a vehicle communication system in electrical communication with the controller, wherein to project the image on the projection screen, the controller is further programmed to:
- retrieve the image using the vehicle communication system; and
- project the image on the projection screen using the projector.

20. The display system of claim 18, further comprising a plurality of vehicle sensors, wherein to determine the intended viewing location of the projection screen, the controller is further programmed to:
- determine a location of one or more vehicle occupants relative to a location of the projection screen using one or more of the plurality of vehicle sensors; and
- determine the intended viewing location based at least in part on the location of the one or more vehicle occupants relative to the location of the projection screen.

* * * * *